United States Patent [19]
Kern et al.

[11] Patent Number: 5,831,366
[45] Date of Patent: Nov. 3, 1998

[54] PERMANENT MAGNET ALTERNATOR

[75] Inventors: Robert Kern, Waukesha; Gerald Ruehlow, Oconomowoc, both of Wis.; Graham McLean, Cheshire, England; Frank Wedel, Lake Mills; Dennis Cerney, Mukwonago, both of Wis.

[73] Assignee: Generac Corporation, Waukesha, Wis.

[21] Appl. No.: 683,529

[22] Filed: Jul. 15, 1996

Related U.S. Application Data

[62] Division of Ser. No. 897,329, Jun. 11, 1992, Pat. No. 5,489,811, and a division of Ser. No. 596,605, Feb. 5, 1996, abandoned.

[51] Int. Cl.⁶ .......................... H02K 31/00; H02K 7/00; H02K 15/00
[52] U.S. Cl. ..................... 310/216; 310/259; 29/596; 29/598
[58] Field of Search ................................ 310/216, 217, 310/254, 258, 259; 29/596; 336/234

[56] References Cited

U.S. PATENT DOCUMENTS

| 3,577,851 | 5/1971 | Detheridge | 29/605 |
|---|---|---|---|
| 3,860,843 | 1/1975 | Kawasaki et al. | 310/67 |
| 3,886,256 | 5/1975 | Ohuchi et al. | 310/216 |
| 4,032,807 | 6/1977 | Richter | 310/178 |
| 4,116,033 | 9/1978 | Iwaki et al. | 72/142 |
| 4,206,621 | 6/1980 | Kawasaki et al. | 72/130 |
| 4,365,180 | 12/1982 | Licata et al. | 310/216 |
| 4,575,652 | 3/1986 | Gogue | 310/49 R |
| 4,626,727 | 12/1986 | Janson | 310/156 |
| 4,831,300 | 5/1989 | Lindgren | 310/190 |
| 4,924,125 | 5/1990 | Clark | 310/67 R |
| 5,030,864 | 7/1991 | Van Hout et al. | 310/67 R |
| 5,289,066 | 2/1994 | Clark | 310/67 R |

Primary Examiner—Thomas M. Dougherty
Assistant Examiner—Tran N Nguyen
Attorney, Agent, or Firm—Reinhart, Boerner, Van Deuren, Norris & Rieselbach, S.C.

[57] ABSTRACT

A permanent magnet alternator includes a stator core having outwardly projecting teeth and further includes a plurality of permanent magnets surrounding the stator core. The stator core is formed from a continuous, helically wound metallic strip having a plurality of teeth defined between slots formed in one edge thereof. The stator core is formed by winding the strip edgewise around a cylindrical mandrel. To facilitate winding and avoid distortion, arcuate regions, conforming to the curve of the mandrel, are formed in the strip opposite the teeth.

4 Claims, 3 Drawing Sheets

PERMANENT MAGNET ALTERNATOR

This is a divisional of application Ser. No. 07/897,329 filed on Jun. 11, 1992 which issued as U.S. Pat. No. 5,489,811 on Feb. 6, 1996, and Ser. No. 08/596,605 filed on Feb. 5, 1996, now abandoned.

BACKGROUND OF THE INVENTION

This invention relates generally to alternators and, more particularly, to alternators intended for use in portable power generating equipment.

Portable power generating equipment typically consists of an internal combustion engine coupled to a generator or alternator that converts the mechanical energy of the engine to electrical energy. Although both generators and alternators rely on a changing magnetic field to induce currents in an electrical winding, alternators, which provide certain mechanical advantages such as the elimination of heavy current-carrying brushes, are best suited for use in portable power generators.

Alternators can use either electrical field windings or permanent magnets to develop the changing magnetic field. Permanent magnets are advantageous in that they totally eliminate the need for brushes and conserve power that would otherwise be lost in the field windings.

Several factors need to be considered in designing a permanent magnet alternator intended for use in a portable power generating apparatus. Although known power generating devices are "portable" in a general sense, such devices frequently weigh over 100 pounds and require two people to lift and carry. Much of the weight and bulk comes from the alternator itself which, along with the internal combustion engine, forms the heart of the power generating device. A constant goal in alternator design is to increase the power output capability without a corresponding increase in alternator bulk and weight.

Another factor that needs to be considered in alternator design is cost. Because the alternator frequently represents a significant fraction of the overall cost of a portable power generating device, alternator cost, particularly in the consumer market, can have a profound effect on the overall commercial success or failure of a particular power generating device. Manufacturing and labor costs, as well as material costs, all affect the final, overall cost of an alternator and the power generating device in which it is incorporated.

Still another factor to be considered is the overall efficiency of an alternator. For a given power output, efficient alternators can be turned by smaller, lighter and more inexpensive engines. This, again, can have a significant effect on the overall commercial success or failure of a portable power generating device.

In view of the foregoing, it is a general object of the present invention to provide a new and improved permanent magnet alternator for portable power generating devices.

It is a further object of the present invention to provide a permanent magnet alternator that is compact, lightweight and efficient in operation.

It is a still further object of the present invention to provide a permanent magnet alternator that is economical in manufacture.

SUMMARY OF THE INVENTION

The invention provides a permanent magnet alternator comprising a relatively rotatable outer rotor defining an open interior region, a plurality of permanent magnets disposed around the open interior region and movable with the outer rotor, and a relatively stationary stator disposed within the open interior region of the outer rotor. The stator includes a stator core supporting one or more stator windings. The stator core comprises a helical plurality of turns formed in a continuous metal strip having a plurality of spaced teeth formed along one edge thereof and a plurality of arcuate segments formed in the other edge thereof opposite the spaced teeth.

The invention also provides a stator core comprising an elongate magnetically permeable strip having first and second edges and a plurality of regularly spaced teeth formed in the first edge and a plurality of inwardly directed arcuate regions formed opposite the teeth in the second edge. The elongate metallic strip is helically wound into a substantially radially symmetrical solid with the first edge outermost so that the teeth extend radially outwardly from the solid and the second edge defines a substantially cylindrical hollow region. The inwardly directed arcuate regions serve to facilitate helical winding of the metallic strip by reducing material stretch in the area of the teeth as the metallic strip is helically wound.

The invention also provides core stock for forming a helically wound stator core. The core stock comprises a metallic strip having a plurality of regularly spaced teeth formed in one edge thereof and a plurality of inwardly directed arcuate regions formed in the other edge thereof opposite the teeth.

The invention also provides a method for forming a stator core comprising the steps of providing a continuous metal strip, forming a plurality of slots in the strip so as to form, between the slots, a plurality of teeth and winding the metallic strip edgewise in a spiral fashion with the teeth extending radially outwardly so as to form a generally cylindrical core.

BRIEF DESCRIPTION OF THE DRAWING

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
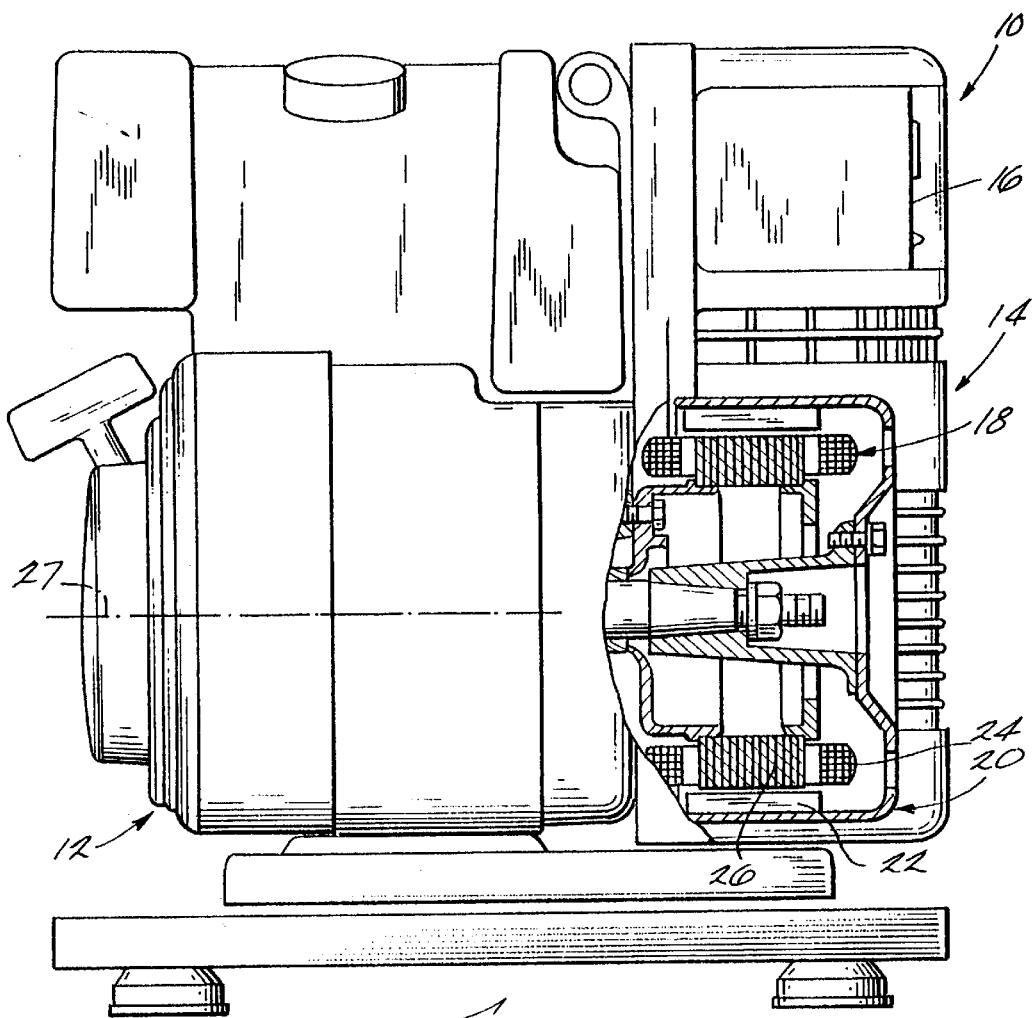
FIG. 1 is a side elevation view of a portable power generator having a permanent magnet alternator constructed in accordance with various aspects of the invention.

Referring to the drawings, a portable power generator 10 is shown in FIG. 1. The power generator 10 generally includes an internal combustion engine 12 coupled to a permanent magnet alternator 14 constructed in accordance with various aspects of the invention. In operation, the engine 12 turns the permanent magnet alternator 14 to develop an alternating current. The power generator 10 further includes a control and regulator circuit 16 that converts the alternating current developed by the alternator into a frequency and voltage regulated alternating current (e.g., 60 Hz. 120 VAC) useful for powering various electrical devices.

Figure 2:
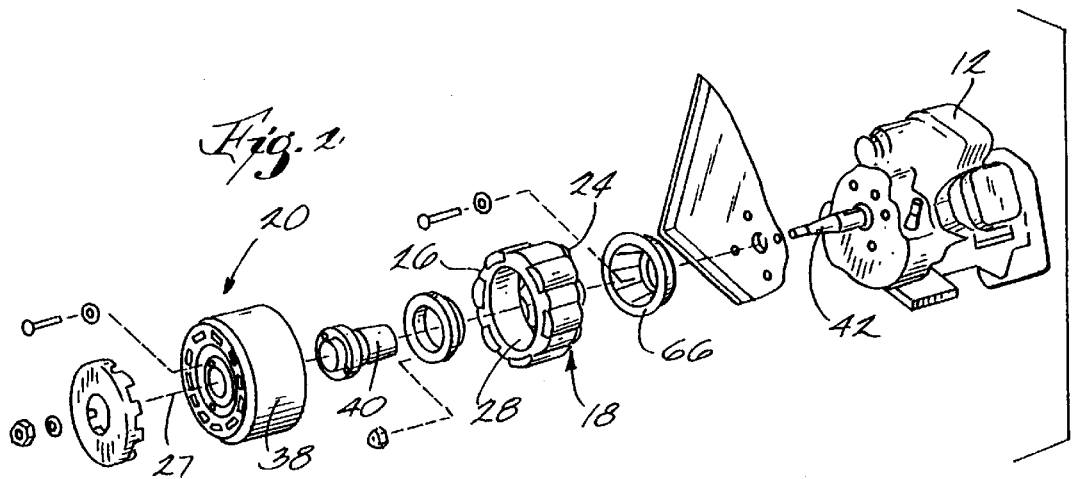
FIG. 2 is an exploded perspective view of a permanent magnet alternator constructed in accordance with various aspects of the invention.

Referring further to FIGS. 1 and 2, the permanent magnet alternator 14 generally includes a stationary stator 18 and a rotor 20 mounted for rotation around the stator 18. The stator 18 is generally cylindrical in form and the rotor 20 includes a plurality of permanent magnets 22 adjacent the outer periphery of the stator 18. As the rotor 20 rotates, the permanent magnets 22 follow a circular path around the outer circumference of the stator 18.

Figure 3:
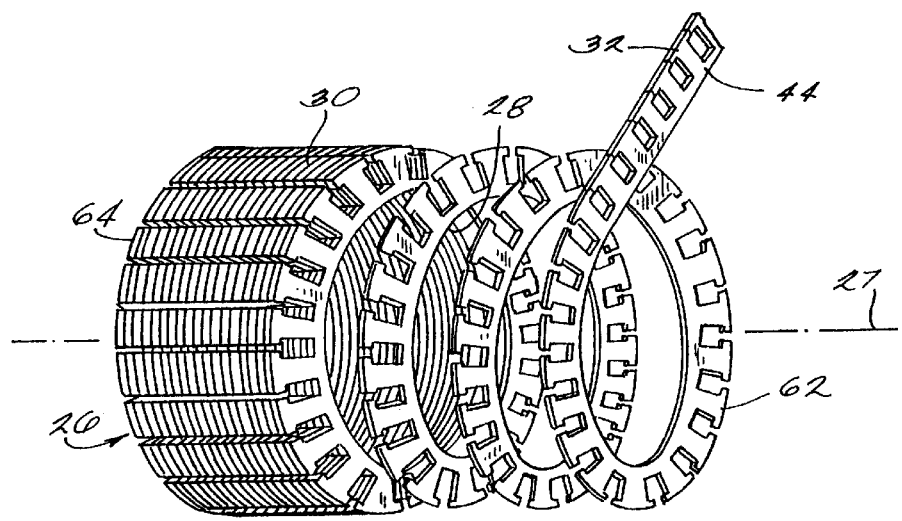
FIG. 3 is a perspective view of a stator core for a permanent magnet alternator constructed in accordance with various aspects of the invention.

The stator 18 comprises a plurality of turns of wire 24 wound onto a generally cylindrical metallic stator core 26 (FIGS. 1, 2 and 3). The windings, in turn, are electrically connected to the control and regulator circuit. The stator core 26, which is radially symmetrical around a central longitudinal 27 axis, is generally tubular in configuration and includes a substantially continuous inner circumferential surface 28 and a substantially discontinuous outer circumferential surface 30. The discontinuous outer surface 30 is formed by a plurality of equally spaced, similarly dimensioned, radially outwardly directed teeth 32. The outer ends of the teeth 32 are flared as shown. This forms a relatively narrow width gap 34 between adjacent teeth 32 at the outer surface 30 of the stator core 26 and a substantially greater width gap 36 between adjacent teeth 32 between the outer and inner circumferential edges 28, 30 of the stator core 26. The windings 24 themselves are largely confined within the spaces between adjacent teeth 32.

Referring to FIGS. 1 and 2, the rotor 20 comprises a metallic, cylindrical rotor housing 38 shaped and dimensioned to encircle the stator 18. The permanent magnets 22 are mounted along the interior of the rotor housing 38. The rotor housing 38 is bolted to a spindle 40 that connects to the crank shaft 42 of the engine 12. Rotation of the crankshaft 42 rotates the spindle 40 and, in turn, the rotor housing 38.

Figure 4:
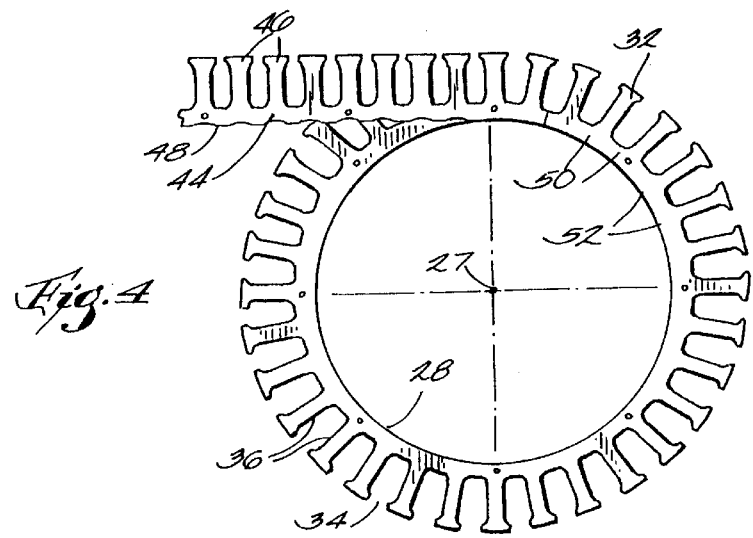
FIG. 4 is a diagrammatic plan view showing a method of winding stator core stock to form a stator in accordance with one aspect of the invention.

The construction and method of manufacture of the stator core 26 can best be understood by reference to FIGS. 3–6. As shown in FIG. 3, the stator core 26 comprises a continuous magnetically permeable strip 44 that is helically wound edgewise into a substantially cylindrical or tubular form. The strip or core stock 44 is preferably formed of steel and is preferably stamped from a continuous elongate strip of substantially constant width and thickness. The individual teeth 32 are formed at regularly spaced intervals along one side 46 of the strip leaving a continuous, unbroken edge 48 along the opposite side of the strip 44. The strip 44 is helically wound around a cylindrical mandrel with the continuous edge 48 innermost. The spacing between adjacent teeth 32 and the diameter of the mandrel are selected so that an integral number of teeth 32 are included within each turn of the core stock around the mandrel. This ensures that the corresponding teeth 32 in adjacent turns remain linearly aligned as the stator core 26 is formed, as best seen in FIGS. 3 and 4.

As best seen in FIG. 4, when the core stock 44 is helically wound edgewise onto the mandrel, the substantially straight continuous edge 48 of the stock must bend and deform to conform to the circular shape of the mandrel. During this process, the core stock 44 must stretch slightly to accommodate the circular shape of the mandrel. In the regions 50 of the core stock 44 between adjacent teeth 32, where the width of the material forming the core stock 44 is relatively narrow, the material exhibits minimal resistance to stretching and readily conforms to the shape of the mandrel. However, opposite the teeth 32 themselves (where the width and area of the core stock are greater), the resistance to such stretching is considerably greater and the inner edge 48 of the core stock 44 opposite the teeth 32 will not readily conform to the circular outer surface of the mandrel. If the continuous edge 48 of the core stock 44 was perfectly straight, the core stock 44 would resist bending in the areas 52 directly opposite the teeth 32 and the core stock 44 would not conform smoothly to the shape of the mandrel. Rather, the individual helical turns of the stator core 26 would buckle and not lie smoothly adjacent one another. To avoid this problem, the continuous edge 48 of the core stock 44 is not perfectly straight but includes inwardly directed arcuate segments 54 opposite each of the teeth as best seen in FIG. 5.

Figure 5:
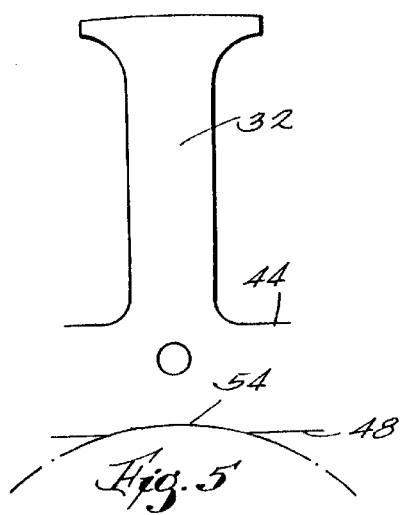
FIG. 5 is an enlarged plan view of one section of the stator core stock shown in FIG. 4, useful in understanding the construction thereof.

As illustrated in FIG. 5, an arcuate section 54, having the same radius of curvature as the mandrel, is formed in the continuous edge 48 opposite each of the teeth 32. As the core stock 44 is helically wound onto the mandrel, the arcuate regions 54 conform to the shape of the mandrel thereby minimizing or eliminating the need for material stretch in the teeth 32 themselves. Between the teeth 32, where material stretch is more easily obtained, the core stock 44 stretches to conform to the shape of the mandrel. By confining substantially all of the material stretch to the region between the teeth, buckling is avoided and the helical turns of the stator core 26 lie flat against one another.

Figure 6:
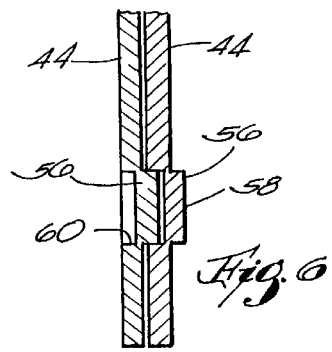
FIG. 6 is fragmentary sectional view of two adjacent windings in a stator constructed in accordance with one aspect of the invention, useful in understanding one method of interlocking adjacent windings in such a stator.

To ensure that the stator core turns remain properly indexed and fixed relative to one another, locking means are provided. In the illustrated embodiment, such locking is provided by punch tabs 56 formed in the faces of adjacent turns of the core stock 44. As best seen in FIG. 6, the punch tabs 56 are located so as to line up with one another as the core stock 44 is wound onto the mandrel. During each turn of the core stock, the punch tab 56 is laterally displaced from the plane of the turn to leave a projection 58 on one side of the turn and a corresponding depression 60 on the opposite side. When the punch tab 56 in the next adjacent turn is so displaced, it projects into the space 60 left by the previous punch tab and thus serves to lock the two turns together. The depression 60 left by this punch tab, in turn, is filled by the punch tab of the following turn. This process is continued during fabrication of the stator core and serves to lock each of the helical turns of the stator core together. Alternatively, the turns can be secured by means of a weld.

Figure 7:
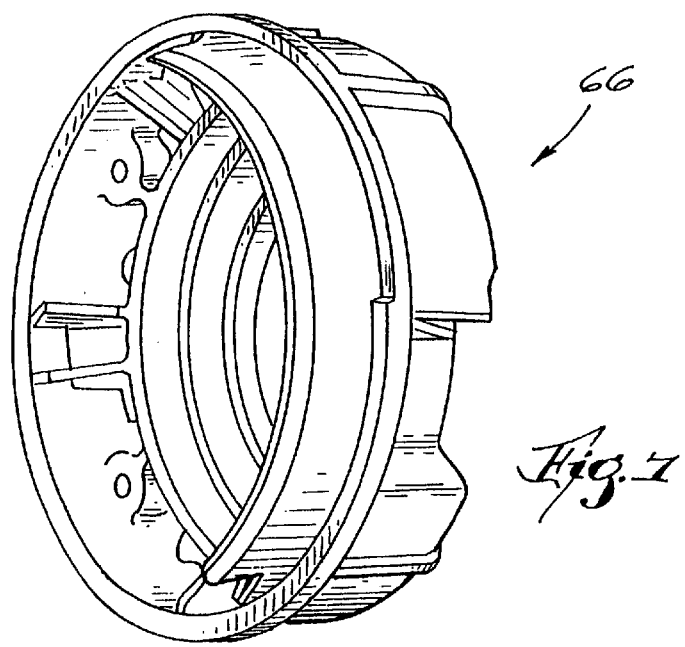
FIG. 7 is a perspective view of a casting adapter constructed in accordance with one aspect of the invention.
Figure 8:
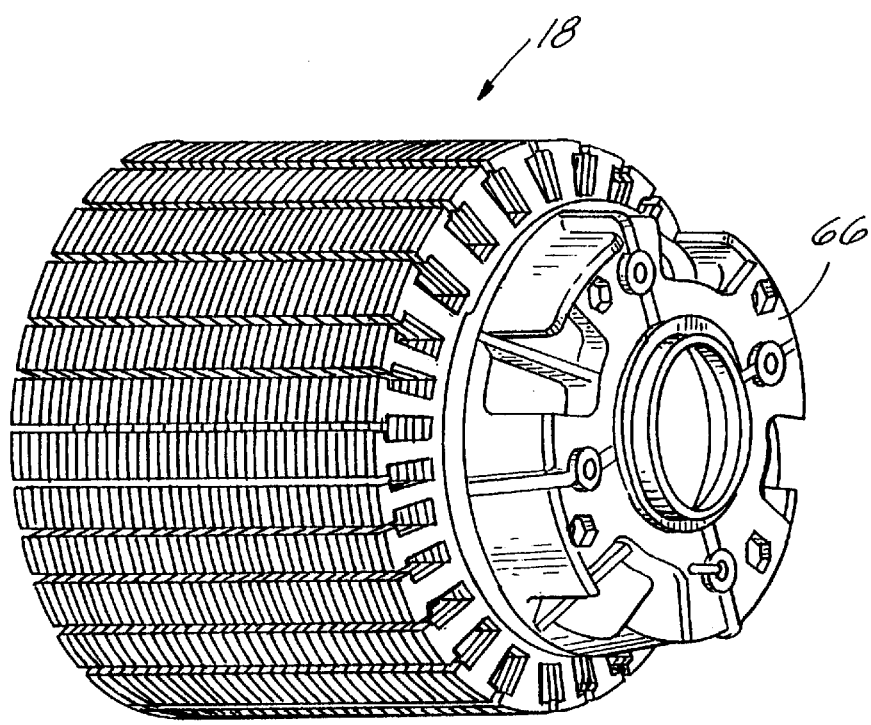
FIG. 8 is a perspective view of the casting adapter in place on the stator core.

Because the stator core 26 comprises a helically wound segment of core stock 44, the forward and rear end faces 62, 64 of the stator core 26 are neither perfectly planar nor do they lie in planes that are precisely perpendicular to the central longitudinal axis 27 of the stator core 26. To ensure that the stator core 26 nevertheless is precisely aligned with the central longitudinal axis of the rotor 20, an offset adaptor 66 (FIGS. 7 and 8), conforming to the helical ramped shape of the end face 62 of the stator core 26, is included in the permanent magnet alternator 14. The offset adaptor 66 conforms to, and compensates for the helical nature of the stator core 26 and functions to orient the stator core 26 in precise coaxial alignment with the central longitudinal axis 27 of the permanent magnet alternator 14.

The permanent magnet alternator 14 herein shown and described provides numerous advantages over prior alternators. Because the teeth 32 of the stator core 26 are directed radially outwardly rather than inwardly, the permanent magnets 22 of the rotor 20 can be placed outside of rather than inside of the stator 18. This has the effect of reducing the physical size of the stator 18. For a given power output, the reduced size of the stator 18 reduces the size and length of the stator windings 24 thereby reducing the total length of wire in the stator windings. Not only does this reduce material costs, but the reduced overall length of the stator windings minimizes the winding resistance and, hence, the power lost in the windings. This improves overall alternator efficiency.

The arcuate sections 54 formed opposite the teeth 32 in the core stock 44 help make practical the use of the helical edge winding technique in forming the stator core 26. Because the stator core stock 44 can be economically stamped from a continuous metallic strip, the practicality of this technique further enhances overall alternator economy.

It will be appreciated by those skilled in the art that although a particular configuration of the permanent magnet alternator has been shown and described, the particular design details, such as the size, shape and number of stator core teeth and permanent magnets, are not limited to those shown herein, and the invention, in its broader aspects, can be applied to a variety of other alternator configurations.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A permanent magnet alternator comprising:

a rotatable outer rotor defining an open interior region;

a plurality of permanent magnets disposed around said open interior region and movable with said outer rotor; and a stationary ring-like stator disposed within said open interior region of said outer rotor, said stator including a stator core supporting one or more stator windings, said stator core comprising a helical plurality of turns forming a ring-like solid continuous magnetically permeable strip having a plurality of outwardly directed spaced teeth formed along one edge thereof and a plurality of arcuate segments formed in the other edge thereof opposite said spaced teeth, including an arcuate segment formed opposite each of the teeth, wherein said arcuate segments are shaped substantially like segments of a circle having a radius substantially equal to the radius of the cylindrical hollow interior region in the center of said ring-like stator.

2. A permanent magnet alternator comprising:

a rotatable outer rotor defining an open interior region;

a plurality of permanent magnets disposed around said open interior region and movable with said outer rotor; and a stationary stator disposed within said open interior region of said outer rotor, said stator including a stator core supporting one or more stator windings, said stator core comprising a continuous magnetically permeable strip having first and second edges and a plurality of outwardly directed spaced teeth formed along said first edge thereof and a plurality of arcuate segments formed in said second edge thereof opposite said spaced teeth, said strip being helically wound into a substantially radially symmetrical solid with said first edge outermost so that said teeth extend radially outwardly from said solid and said second edge defines a substantially hollow region, including an arcuate segment formed opposite each of the teeth, wherein the radius of curvature of the arcuate segments is equal to the radius of curvature of the inner diameter of said hollow region of said stator core.

3. The permanent magnet alternator as defined in claim 2 wherein said plurality of arcuate segments formed in the second edge of the continuous magnetically permeable strip extend along the inner diameter of the surface of the hollow region.

4. A permanent magnet alternator comprising:

a rotatable outer rotor defining an open interior region;

a plurality of permanent magnets disposed around said open interior region and movable with said outer rotor; and a stationary stator disposed within said open interior region of said outer rotor, said stator including a stator core comprising an elongate magnetically permeable strip having first and second edges and a plurality of regularly spaced teeth formed in said first edge and a plurality of inwardly directed arcuate regions formed opposite said teeth in said second edge, said second edge initially being substantially straight between said teeth, said strip then being helically wound into a substantially radially symmetrical solid with said first edge outermost so that said teeth extend radially outwardly from said solid and said second edge defines a substantially cylindrical hollow region, said inwardly directed arcuate regions having a radius substantially equal to a radius of said cylindrical hollow interior region in the center of said stator, and serving to facilitate helical winding of said magnetically permeable strip by reducing material stretch in said teeth as said strip is helically wound so that substantially all of said material stretch occurs between said teeth.

* * * * *